D. F. OLIVER.
SHOCK ABSORBER AND RECOIL CHECK.
APPLICATION FILED JULY 17, 1914.
1,151,036.
Patented Aug. 24, 1915.
2 SHEETS—SHEET 1.
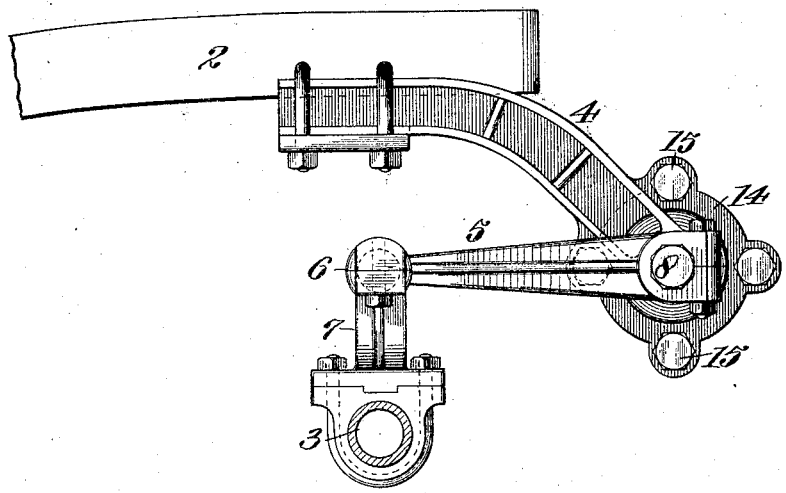
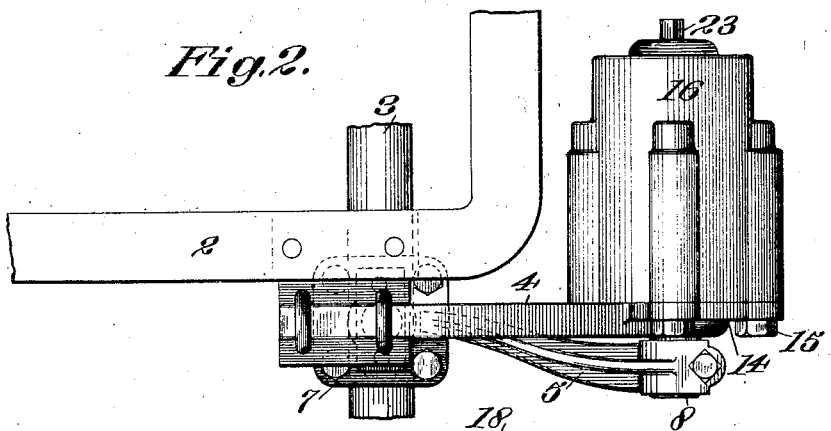
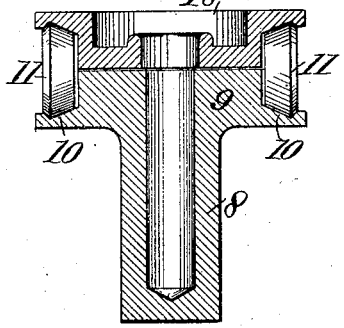
WITNESSES:
INVENTOR
Doctor F. Oliver,
BY G. H. Strong.
ATTORNEY

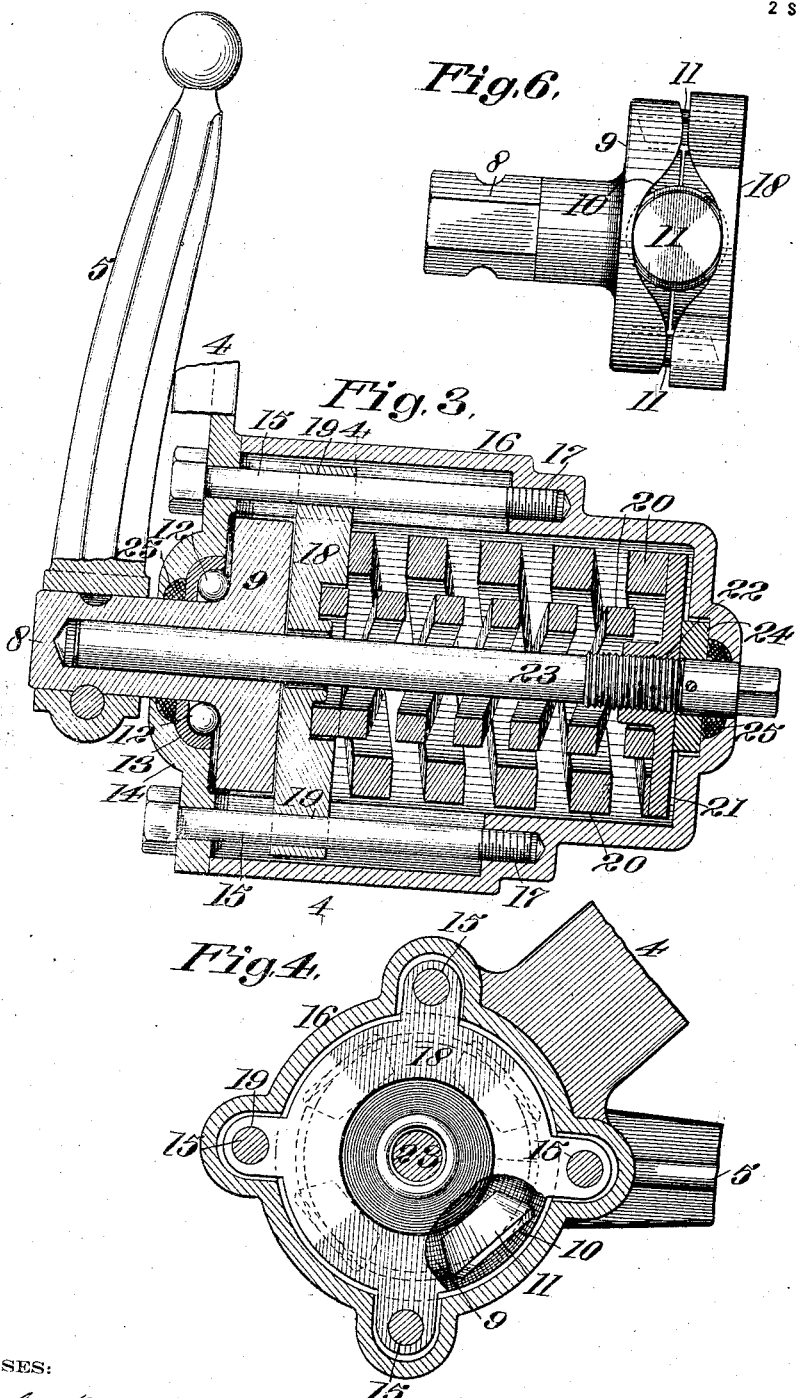

UNITED STATES PATENT OFFICE.

DOCTOR F. OLIVER, OF OAKLAND, CALIFORNIA.

SHOCK-ABSORBER AND RECOIL-CHECK.

1,151,036. Specification of Letters Patent. Patented Aug. 24, 1915.

Application filed July 17, 1914. Serial No. 851,495.

*To all whom it may concern:*

Be it known that I, DOCTOR F. OLIVER, a citizen of the United States, residing at Oakland, in the county of Alameda and State of California, have invented new and useful Improvements in Shock-Absorbers and Recoil-Checks, of which the following is a specification.

This invention relates to a spring suspension and supporting device in the nature of a shock absorber and recoil check.

It is an object of the present invention to provide a shock absorber and recoil check capable of being readily adjustable to efficiently operate to support resiliently loads of different degrees; to provide a device of this character which is simple, and the parts of which are readily assembled and easily taken apart and are substantial and durable; and to provide a device of this type which may be readily packed against leakage, when charged with a lubricant, and which may be readily applied to the running gear and chassis of a vehicle without altering the same, other than by drilling for the attachment of a suitable hanger connection.

Other objects of the invention will be made manifest in the following specification.

The invention consists of the parts and the construction and combination of parts as hereinafter more fully described and claimed, having reference to the accompanying drawings, in which—

Figure 1 is a side view of the device as applied. Fig. 2 is a plan view thereof. Fig. 3 is a central longitudinal section through the device. Fig. 4 is a section on line 4—4, Fig. 3. Fig. 5 is a sectional detail through one of the thrust roller bearings. Fig. 6 is an edge view of the disks.

2 indicates a portion of a vehicle chassis and 3 the axle of a part of the running gear of the vehicle. To the chassis there is suitably connected an upwardly curved lever arm 4, while a suitable lever arm 5, with a ball and socket joint 6, is secured by a bracket 7 to the axle 3. The lever arm 5 is keyed, pinned or otherwise suitably secured to a tubular hub 8, having a disk 9 on its inner end, the inner diametral surface of which is provided with an undulating surface 10 forming successive ridges and valleys, against which bears and runs a set of suitable thrust rollers 11, though these need not necessarily be used.

The ridged disk 9 is supported on its outer diametral surface by a set of ball-bearings 12 running on a bearing ring 13, which in turn is supported by a cap 14, to which the lever arm 4 is connected or integrally formed. The cap 14 is pierced by a plurality of cap screws 15 which extend longitudinally into a cylindrical casing 16, which is tapped at 17 to receive the cap screws 15.

Bearing upon the opposite sides of the thrust rollers 11 from the ridged disk 9 is a similarly ridged disk 18, with apertures 19 near its circumference through which the fastening screws 15 extend and which serve to prevent the disk 18 from revolving but guiding it for longitudinal movement. Reacting upon the rear side of the disk 18 is one or more helical springs 20, of suitable proportion and strength, which seat at their opposite ends upon a washer or seat member 21 with threads 22 fitting the threaded portion of a central spindle 23. The spindle 23 extends centrally through the housing 16 and is supported at its forward end in the tubular hub 8 of the disk 9; the opposite end of the spindle 23 being suitably formed to receive a wrench, or other tool, whereby it may be turned so as to shift the spring seat 21 forwardly or rearwardly for the adjustment of the degree of pressure of the springs 20 against the adjacent and longitudinally movable disk 18. The spindle 23 is provided with a fixed collar 24, seating against the bottom of the casing 2, to prevent the outward movement of the spindle. The casing is preferably rendered oil tight by the provision of packing rings 25, one at each end, for the retention of a suitable lubricant within the casing 16.

The operation of the device is as follows: With the springs 20 set under the desired degree of compression, through the adjustment of the spring seat 21, and with the chassis 2 of the vehicle in its normal position above the axle 3, then upon the downward movement of the chassis toward the axles the upper lever 4 and the lever 5 have a relative movement toward each other and a relative turning movement about the axis of the spindle 23. The relative rotation of the levers 4 and 5 tends to rotatively change the position of the disk 9 with relation to the disk 18; the disk 9 being attached, as before stated, to the lever 5 and the disk 18 being held against rotation through means of the fastening screws 15 of the casing 16. Upon the tendency of relative rotation between the disks 9 and 18, these latter will be automatically separated, owing to the rolling movement of the thrust rollers 11 which are interposed between these disks and which support the pressure due to the reaction of the springs 20. As the disks 9 and 18 relatively turn, the rollers 11 tend to ride up the inclined walls of the undulating surfaces 10; the degree of separation of the disks 9 and 18 being determined by the degree of relative rotation and the separation being equal to the diameter of the rollers 11, when the disks are separated the maximum distance, with the rollers resting upon the ridges of the undulating surfaces. Upon the upward movement of the chassis away from the axles 3 of the vehicle, the rollers 11 again move down the undulating surfaces toward the valleys thereof. This allows the slidable disk 18 to again move toward the non-slidable disk 9, and if there is a rebounding tendency of the chassis with relation to the vehicle axles, then the relative movement of the levers 4 and 5 away from each other tend to relatively rotate the disks 9 and 18 and again move the rollers 11 out of the opposite valleys and up the opposite inclines of the undulating surface, thus again bringing into action the reacting springs 20 which act then as resilient checks against the recoil.

As shown in Fig. 5, the rollers 11 may be in the form of double truncated cones with their bases in juxtaposition forming a ridge in the periphery of the rollers. This ridge runs in the curved undulating tracks and is prevented by the walls of the tracks from radial movement toward or from the spindle 23.

Having thus described my invention, what I claim and desire to secure by Letters Patent is—

1. A shock absorber and recoil check, comprising a casing, a disk mounted in one end of the casing for relative rotation and having a portion extending through the casing and carrying a lever connectible to a part of a vehicle, a laterally shiftable plate in the casing, resilient means in the casing reacting upon said plate to shift the latter toward said disk, coöperating means between said plate and said disk which react when the plate and disk rotate relatively to cause the separation of same, and a means for varying the degree of pressure of said resilient means, said means comprising a threaded spindle projecting through one end of the casing and adapted for rotation by the application of a suitable tool and carrying a member supporting said means.

2. In combination with a casing having a closed and an open end, an arm having a cap secured thereto, bolts extending longitudinally of the casing, and connected to the latter and to the cap to cause the latter to cover the open casing end, a disk apertured to slidingly receive the bolts mounted within the casing, a second disk in the casing confronting the first disk and having a hub which extends through the cap, coöperating means between the adjacent faces of the disks for effecting separation of the disks upon relative rotation of the latter, a spring bearing against the first disk, a turnable spindle journaled in the hub of the second disk and extending through the closed casing end and having a threaded part, a member on the threaded spindle part engaging the spring, and an arm connected to the hub of the second disk.

3. In combination with a casing having an arm thereon which latter is for attachment to a vehicle body, a pair of members in the casing, coöperating means between said members for effecting separation thereof upon relative rotation of the members, a spindle on which said members are mounted for partial rotary movement, an arm for attachment to the vehicle axle connected to one of the members, a spring abutting one of the members at one end thereof, and means mounted on the spindle and engaging the opposite end of the spring to tension the latter and to adjust the spring tension upon rotation of the spindle, said spindle having one end projecting without the casing to enable manual turning thereof.

4. In combination with a casing having means for attachment to a vehicle body, a pair of members in the casing, coöperating means between said members for effecting separation thereof upon relative rotation of the members, a spindle on which one of the members is slidably mounted and on which the other member is mounted for partial rotation, means on the rotatable member for attachment to the vehicle axle, means to hold the slidable member against rotation, a spring surrounding the spindle but ting the slidable member, and means on the spindle and operable from without the casing by rotation of the spindle to adjust the tension of the spring.

In testimony whereof I have hereunto set my hand in the presence of two subscribing witnesses.

DOCTOR F. OLIVER.

Witnesses:
MARIE GREER,
G. A. DOTY.